United States Patent Office 2,893,843
Patented July 7, 1959

2,893,843

COMPOSITION OF MATTER

Ernest C. Adams, Jr., Elkhart, Ind., assignors to Miles Laboratories, Inc., Elkhart, Ind., a corporation of Indiana No Drawing. Application February 3, 1956
Serial No. 563,181

7 Claims. (Cl. 23—253)

This invention relates to a novel method and means for the detection and estimation of glucose.

My invention has for one of its principal objects the provision of a simple, rapid, and convenient means for performing such a test with a high degree of accuracy and simplicity without the need for extensive equipment or trained personnel and the like.

While the present invention is applicable to the determination of the glucose content of a wide variety of materials one of its most important applications is in the detection of glucose in body fluids such as urine. The determination of glucose in urine is, of course, extremely important not only to diabetic patients who must control their sugar input, but is essentially involved in those situations where large numbers of people are "screened" to determine the incidence of diabetes among them. An improved, specific test for glucose in urine and other body fluids would, naturally, be of tremendous importance as an aid in the detection of this disease.

While there are a number of techniques which can be used to measure or estimate the amount of glucose in urine, the most common tests used are based on the reducing action of glucose, and are "non-specific" in that other sugars and even non-sugar reducing substances will give positive tests. The foregoing are mentioned as being in addition to the other undesirable, inherent features of the prior art tests, namely, the need for test tubes and other equipment, heat, and frequently, technical skill.

It is in order to additionally point out that the diabetic patient often tests the urine a number of times a day and that to many, the customary tests are quite distasteful to perform. A simple and an improved test, one for example, that required no test tube, but yet which was reliable and could be completely carried out by the diabetic would be an extremely useful contribution indeed.

To that end, I have now discovered a novel, improved, highly effective means for detecting glucose in various materials, including body fluids, and particularly urine, which is simple, economical, rapid, convenient, reliable, which does not require heat such as many of the prior art techniques and test do, and which is otherwise free of many of the disadvantages which characterize the prior art compositions, test means and procedures.

My invention operates on a new and different principle and takes advantage of the fact that in an aerobic system, in the presence of glucose aerodehydrogenase (glucose oxidase), glucose is oxidized to gluconic acid and hydrogen peroxide. This reaction is highly specific for glucose, other sugars being oxidized only to an infinitesimal extent.

The resulting hydrogen peroxide can be detected in any one of a number of ways by a color given with, for example, blood, or certain components thereof, and a suitable indicator such as o-tolidine, benzidine and other members of the group represented by those indicators, as well as leuco-dyes, monoamines, diamines, phenols, diphenols, aromatic acids and iodides.

In preparing the compositions of my invention, glucose oxidase, blood (or certain components) and an indicator system are suitably combined for the purpose of detecting the presence of glucose in urine and similar body fluids. The test "device" itself may comprise such composition in the form of a tablet, powder, bibulous paper impregnated with a solution or a suspension of the ingredients, or in fact in numerous other forms. Furthermore, such additives as protective agents, buffer systems and the like, may also be added to the composition.

The components of the composition of my invention can be varied widely, to contain, for example, from 10 mg. of indicator, e.g. o-tolidine dihydrochloride per 100 tests to 200 mg. of such indicator per 100 tests.

The glucose oxidase component can likewise be varied, e.g. from 10 mg. to about 200 mg. per 100 tests.

The blood component of the composition can also be varied from, for example, 0.02 ml. to 1 ml. per 100 tests and its red blood cell-to-plasma ratio can be modified from the normal (in which the cellular volume is 45%) by adding plasma so that the cellular volume is, illustratively 0.3, 1.5, 2.8, 3.8, 4.1 or 10.4%. Likewise normal whole blood, red blood cells alone, lyophilized whole blood, lyophilized blood cells, lyophilized blood and lyophilized plasma in varying ratios can be used, as the "blood component."

The glucose oxidase component of my invention may conveniently be the commercial product known as "Dee-O" or as "Dee-G" which is produced and sold by the Takamine Laboratories, of Clifton, New Jersey. This product has an activity of about 2600 units per gram, a unit being that quantity of enzyme which will cause a rate of oxygen uptake of 10 cu. mm. at 30° C. by a solution of glucose contained in a Warburg flask.

The following examples will serve to illustrate a number of embodiments of the invention and illustrate its flexibility particularly with respect to the amounts and proportions of ingredients and components. It will be understood, of course, that obviously, these embodiments have been chosen only as illustrative of my invention, and that various modifications may be made without departing from the spirit and scope of the invention.

*Example I*

A mixture having the following composition was prepared by mixing together:

200 mg. glucose oxidase
1 ml. whole blood
10 ml. plasma
200 mg. o-tolidine dihydrochloride This mixture was used to impregnate filter paper strips; the strips after drying, gave a blue color when contacted with a glucose-containing urine.

Similar filter paper strips were prepared using the compositions set forth in Examples 2, 3, 4, 5, 6 and 7 below with similar results.

*Example II*

200 mg. glucose oxidase
138 mg. lyophilized red blood cells
200 mg. o-tolidine dihydrochloride

Example III 50 mg. o-tolidine dihydrochloride
0.1 ml. blood
3 ml. plasma
50 mg o-tolidine dihydrochloride

Example IV 200 mg. glucose oxidase
150 mg. lyophilized blood
200 mg. o-tolidine dihydrochloride

Example V 50 mg. glucose oxidase
0.1 ml. blood
50 mg. o-tolidine dihydrochloride
100 mg. sodium acetate

Example VI 200 mg. glucose oxidase
0.2 ml. blood
3 ml. plasma
200 mg. o-tolidine dihydrochloride It has already been observed that the glucose oxidase, blood or blood derivatives or equivalents thereof, and the indicator system can be made up in the form of a tablet, powder, bibulous paper impregnated with a solution or a suspension of the cited ingredients, or numerous other forms; it is also understood that, of course, protective agents such as gelatin and buffer systems for maintaining the pH of the composition at between about pH 4 and pH 6 may be added to the compositions.

The following example illustrates in detail, still another embodiment of my invention:

Example VII

A composition was prepared having the following make-up:

100 mg. glucose oxidase
0.2 ml. blood
500 mg. gelatin
100 mg. 2,7-diaminofluorene dihydrochloride
5 ml. 4 N, pH 5.4 citrate buffer
10 mg. FDA Red No. 22 dye In preparing the above, the gelatin is preferably dissolved in 9 ml. of hot water and the diaminofluorene dihydrochloride in 2.5 ml. of water. The freshly prepared solution of indicator is added to and mixed with the solution of gelatin. The resulting solution is then placed in a 50° C. water bath and the buffer solution is slowly added with stirring. The glucose oxidase is dissolved in 2.5 ml. of water and the blood is then added to the glucose oxidase solution. The other mixture is removed from the water bath and the glucose oxidase-blood solution added and mixed. Then the dye (used to provide a "contrasting" background when tests are made, and it being understood that other equivalent dyes can be used) in 1 ml. of water, is added and also mixed, and the resulting composition is used to impregnate paper strips, which are then air dried and are ready for use, as hereinbefore described, in detecting glucose by contacting a strip with the fluid being tested and observing whether a blue color (positive test) develops thereon.

I claim:

1. A composition for detecting glucose which comprises glucose oxidase, a member of the group consisting of blood, red blood cells, lyophilized whole blood, lyophilized blood cells, and mixtures of lyophilized blood and lyophilized plasma, which after being freed from glucose as a result of contact with said glucose oxidase, has then been admixed with a compound which undergoes a color reaction when contacted with hydrogen peroxide and a member of the group consisting of blood, red blood cells, lyophilized whole blood, lyophilized blood cells, and mixtures of lyophilized blood and lyophilized plasma, and a buffer for maintaining the pH of the aforesaid mixture at about 5.4 in the presence of urine.

2. A composition for detecting glucose which comprises glucose oxidase, a member of the group consisting of blood, red blood cells, lyophilized whole blood, lyophilized blood cells, and mixtures of lyophilized blood and lyophilized plasma, which after being freed from glucose as a result of contact with said glucose oxidase, has then been admixed with a compound which undergoes a color reaction when contacted with both hydrogen peroxide and a member of the group consisting of blood, red blood cells, lyophilized whole blood, lyophilized blood cells, and mixtures of lyophilized blood and lyophilized plasma.

3. A composition for detecting glucose which comprises glucose oxidase, a member of the group consisting of blood, red blood cells, lyophilized whole blood, lyophilized blood cells, and mixtures of lyophilized blood and lyophilized plasma, which after being freed from glucose as a result of contact with said glucose oxidase, has then been admixed with a compound which undergoes a color reaction when contacted with both hydrogen peroxide and a member of the group consisting of blood, red blood cells, lyophilized whole blood, lyophilized blood cells, and mixtures of lyophilized blood and lyophilized plasma, a buffer for maintaining the pH of the aforesaid mixture at about 5.4 in the presence of urine and a protein degradation product.

4. A composition for detecting glucose which comprises glucose oxidase, a member of the group consisting of blood, red blood cells, lyophilized whole blood, lyophilized blood cells, and mixtures of lyophilized blood and lyophilized plasma, which after being freed from glucose as a result of contact with said glucose oxidase, has then been admixed with a compound which undergoes a color reaction when contacted with both hydrogen peroxide and a member of the group consisting of blood, red blood cells, lyophilized whole blood, lyophilized blood cells, and mixtures of lyophilized blood and lyophilized plasma, a buffer for maintaining the pH of the aforesaid mixture at about 5.4 in the presence of urine, and gelatin for stabilizing said composition.

5. A test indicator for detecting glucose which comprises a bibulous material which contains therein a mixture of glucose oxidase, a member selected from the group consisting of blood, red blood cells, lyophilized whole blood, lyophilized blood cells, and mixture of lyophilized blood and lyophilized plasma, which after being freed from glucose as a result of contact with said glucose oxidase, has then been admixed with a compound which undergoes a color reaction when contacted with both hydrogen peroxide and a member selected from the group consisting of blood, red blood cells, lyophilized whole blood, lyophilized blood cells and mixtures thereof.

6. A test indicator for detecting glucose which comprises a bibulous carrier containing impregnated therein a composition comprising glucose oxidase, a member selected from the group consisting of blood, red blood cells, lyophilized whole blood, lyophilized blood cells, and mixtures of lyophilized blood and lyophilized plasma, which after being freed from glucose as a result of contact with said glucose oxidase, has then been admixed with gelatin and an indicator which undergoes a color reaction when contacted with both hydrogen peroxide and a member selected from the group consisting of blood, red blood cells, lyophilized whole blood and lyophilized blood cells, a buffer for maintaining the pH of the aforesaid mixture at about 5.4 in the presence of urine, and a dye which is in color contrast with blue.

7. A test indicator for detecting glucose which comprises a bibulous material which contains therein the dried residue resulting from deposition on the said material, followed by drying, of a liquid comprising glucose oxidase, a member selected from the group consisting of blood, red blood cells, lyophilized blood, lyophilized blood cells and mixtures of lyophilized blood and lyophilized plasma, which mixture is glucose-free as a result of catalytic oxidation effected by the said glucose oxidase of any glucose in the said member, to gluconic acid, and a compound which undergoes a color reaction when contacted with both hydrogen peroxide and the said member.

References Cited in the file of this patent

UNITED STATES PATENTS

| | | |
|---|---|---|
| 2,482,724 | Baker | Sept. 20, 1949 |
| 2,614,062 | Keil | Oct. 14, 1952 |

FOREIGN PATENTS

| | | |
|---|---|---|
| 708,996 | Great Britain | 1952 |

OTHER REFERENCES

Keilen et al.: Biochemical Journal, vol. 42, 1948, pp. 230–238.